Patented Feb. 13, 1951

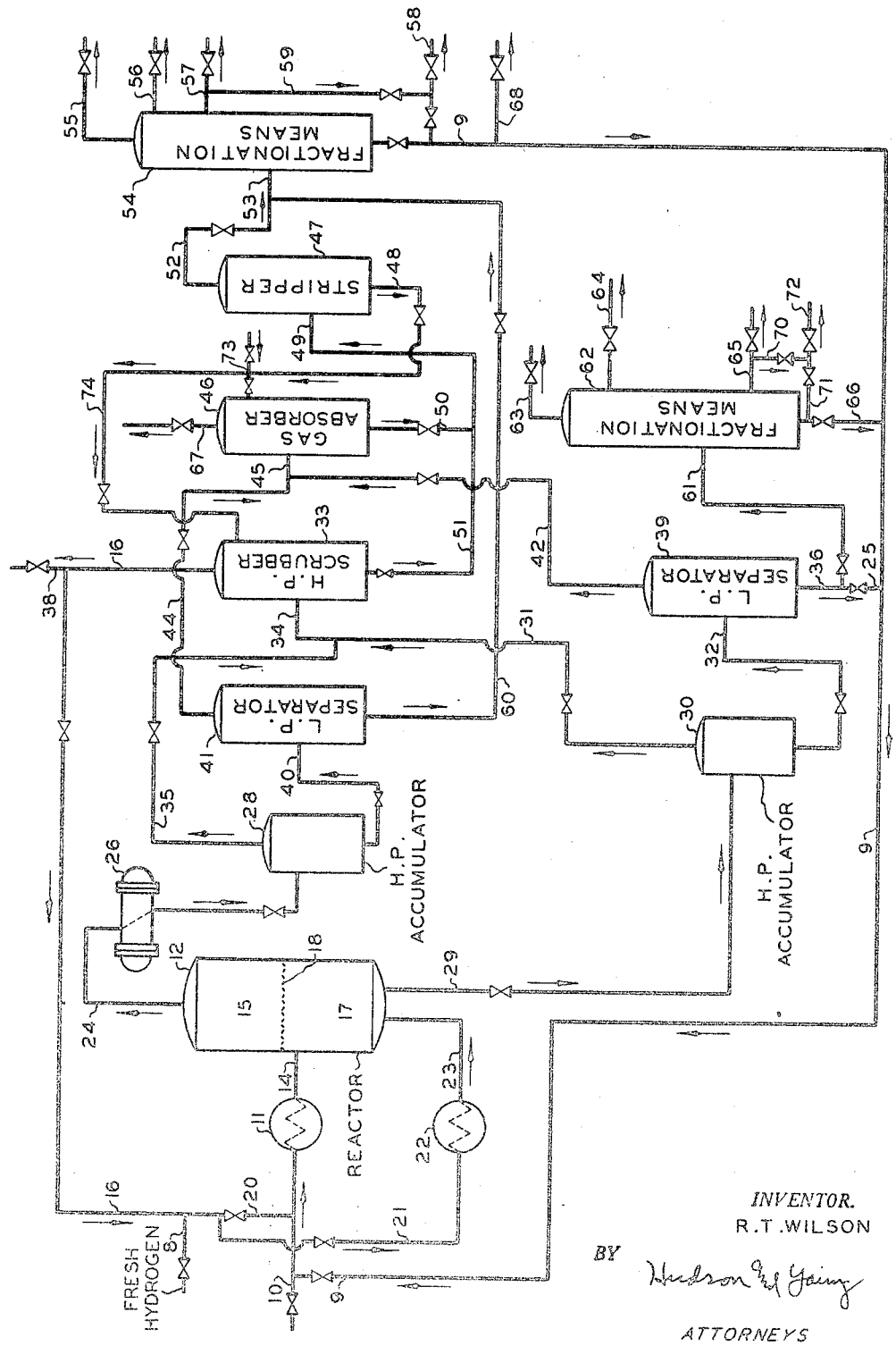

2,541,317

UNITED STATES PATENT OFFICE 2,541,317

HYDROGENOLYSIS PROCESS FOR THE PRODUCTION OF GASOLINE AND DIESEL OIL FROM PETROLEUM RESIDUE STOCKS

Reagan T. Wilson, Bartlesville, Okla., assignor to Phillips Petroleum Company, a corporation of Delaware Application July 9, 1948, Serial No. 37,887

11 Claims. (Cl. 196—49)

This invention relates to treatment of petroleum residues. In one embodiment this invention relates to hydrogenolysis of residual hydrocarbon fractions. In one specific aspect, this invention relates to the hydrogenolysis of petroleum residues in a two-catalyst system.

The reaction of gaseous hydrogen with petroleum residues, asphaltic oils, tarry materials and the like, at conditions of elevated temperature and pressure is commonly referred to as hydrogenolysis. Such residual materials when ordinarily subjected to cracking conditions of temperature and pressure, rapidly carbonize, but under such cracking conditions in the presence of hydrogen are converted to gasoline, gas oil, and other valuable hydrocarbon materials. Hydrogenolysis may be considered to be a destructive type reaction combined with hydrogenating the destruction products, whereby the normal cracking tendencies of the residual charge stock are suppressed in favor of its reconstitution to useful products.

Hydrogenolysis is especially applicable to heavy petroleum fractions such as heavy gas oils, high-boiling tarry fractions, reduced crude, and other heavy fractions. Products of hydrogenolysis of such charge stocks include normally gaseous fractions, gasoline, kerosene, Diesel oil, fuel oil, light gas oil, and the like.

Although such reactions can be conducted non-catalytically, catalytic reactions are preferable from the standpoint of product quality and yield. Hydrogenolysis catalysts commonly used include oxides of molybdenum, chromium, and vanadium, and sulfides of molybdenum, tungsten, and nickel. Other catalysts may be used, especially when sulphur-free stocks are treated.

Catalytic hydrogenolysis of petroleum residues is usually conducted in the pressure range of 1000–20,000 p. s. i. g., and at temperatures of at least 700° F. Space velocities, i. e., the volume of fresh oil stock charged per catalyst volume per hour, are usually in the range of 0.5:1 to 3:1. The products of hydrogenolysis include saturated hydrocarbons in the boiling range of gasoline, Diesel oil, fuel oil, and light gas oil. The process is generally conducted with concurrent flow of all reactants in mixed or in liquid phase.

One difficulty commonly encountered in such a process is short catalyst life, which results from excessive carbon deposition on the catalyst surface. In many such instances the deposition of carbon is so great as to impede appreciably, the passage of reactants. In order to traverse such difficulties, workers in the prior art have been reluctant to use certain active hydrogenolysis catalysts with certain feeds having pronounced tendencies to deposit carbon. On the other hand, some hydrogenolysis catalysts exhibit only minor tendencies toward carbon deposition and have a reasonably long life. However, when employing such long lived hydrogenolysis catalysts, the products obtained are often undesirably low in quality and yield. For example, the hydrogenolysis of petroleum residues may be conducted in the presence of molybdenum trioxide-on-silica-alumina (0.5 to 20 weight per cent molybdena and 0.5 to 10 per cent alumina) at a temperature preferably in the range of 825° F. to 900° F. and at a pressure in the preferred range of 4000–5000 p. s. i. g. The gasoline produced in the presence of this catalyst has a high octane number; the Diesel oil so produced is a good quality. The disadvantage with the use of the molybdena-on-silica-alumina catalyst is its inability to convert heavy residues for a reasonable length of time without the occurrence of excessive carbon deposition, or coking. On the other hand, when conducting hydrogenolysis in the presence of a molybdena-on-alumina type catalyst (0.5 to 20 weight per cent molybdena) in the preferred range of 850–910° F., carbon deposition is not excessive and catalyst life is reasonably long. When employing this catalyst, however, the gasoline product is of low quality and yield, although a high quality Diesel oil product is obtained.

It would obviously be advantageous to conduct the hydrogenolysis of petroleum residues in a manner such not only high-quality Diesel oil, but in addition thereto, high quality gasoline would be produced, each in high yield. Especially would it be desirable, to effect such production without the concomitant excessive deposition of carbon, along with consequent short catalyst life, which is economically undesirable both from the standpoint of lost operating time and catalyst regeneration costs.

An object of this invention is to provide a process for the hydrogenolysis of petroleum residues.

Another object is to provide a method of hydrogenolysis for producing gasoline and Diesel oil of relatively high quality in high yield, from residual petroleum stocks.

Another object is to provide a process for the hydrogenolysis of residual petroleum stocks, which process utilizes a plurality of hydrogenolysis catalysts, and in so doing realizes advantages accruing from the desirable characteristics of each catalyst and avoids effects normally resulting from the undesirable characteristics of each when used alone in such a hydrogenolysis.

Other objects will be more apparent to one skilled in the art from the accompanying discussion and disclosure.

In accordance with this invention, petroleum residues are subjected to hydrogenolysis in a reactor containing a lower catalyst bed of molybdena-on-alumina and an upper catalyst bed of molybdena-on-silica-alumina. Heated charge stock together with hydrogen, is introduced at a point in the upper portion of the molybdena-on-alumina catalyst bed, and heated hydrogen is introduced at a point in the lower portion of the reactor, preferably at the bottom. The charge stock is partially vaporized upon initially contacting the catalyst. The unvaporized portion passes downwardly in contact with the molybdena-on-alumina catalyst, in countercurrent flow with the hydrogen introduced, in the lower portion, or more preferably at the bottom of the lower catalyst bed. Hydrocarbon vapors are formed during the countercurrent flow and are removed from the molybdena-on-alumina catalyst zone together with hydrocarbon vapors and hydrogen initially present in the upper portion thereof, by stripping action of the countercurrently flowing hydrogen. The resulting hydrogen-hydrocarbon vapor passes upward through the molybdena-on-silica-alumina catalyst bed in the upper portion of the reactor. Very little carbon deposition takes place on either catalyst and consequently the life of each is long.

Hydrogenolysis of the unvaporized portion of the charge stock takes place in the lower catalyst bed to produce high-quality Diesel fuel simultaneously with hydrogenolysis of the vaporized portion of the charge stock in the upper catalyst bed to produce high-quality gasoline. This invention, therefore, provides a means of taking advantage of the desirable characteristics of each catalyst and of avoiding the effects of the undesirable characteristics of each, i. e., the non-coking characteristics of the lower catalyst bed and the high octane gasoline producing characteristics of the upper catalyst are fully utilized.

Products of the process of this invention, produced in the upper catalyst bed, include normally gaseous hydrocarbons, such as ethane, propane, and butane; and high grade gasoline along with Diesel oil of good quality and smaller amounts of light and heavy gas oils. Products produced in the lower catalyst bed are chiefly high-quality Diesel oil, together with fuel oil and light and heavy gas oils. The products of the overall process, which are obtained in major yields are relatively high-quality gasoline and high-quality Diesel oil.

In the practice of this invention, it is advantageous to recycle residual oil streams and hydrogen-rich streams to the reactor.

Various methods have been employed in the preparation of the catalysts used in my process. The molybdena-on-silica-alumina catalyst may be prepared from a silica-alumina prepared by first forming a hydrous silica gel from an alkali silicate, such as sodium silicate, and an excess of acid, water washing the soluble material from the gel thus formed, partially drying the washed gel, and activating the partially dried gel with an aqueous solution of an aluminum salt, such as aluminum sulfate. In this manner, a part of the aluminum, presumably in the form of a hydrous oxide, or a loose hydroxide formed by hydrolysis, is selectively absorbed by the hydrous silica and is not removed by subsequent washing. The silica-alumina thus prepared contains a major proportion of silica and a minor portion of alumina and comprises hard glossy granules. The minor portion of alumina will generally not be in excess of 10 per cent by weight.

The molybdena-on-silica-alumina catalyst may be made from a silica-alumina, prepared by methods other than that above described. For example, a silica-alumina gel may be prepared by any known coprecipitation method to produce a gel having either silica or alumina as the major component in a concentration as high as 90-95 per cent, if desired. In such a method, an aqueous solution of an alkali metal silicate, such as sodium silicate, and an aqueous solution of an aluminum salt, such as aluminum nitrate, are each made up in the desired concentration and mixed. The pH of the alkali metal silicate solution and of the aluminum salt solution, is adjusted so that upon mixing the two solutions, coprecipitation takes place immediately. When employing sodium silicate and aluminum nitrate, the respective pH values are about 10 and about 3 so that when the solutions are mixed, the pH of the resulting solution will be nearly neutral with coprecipitation immediately taking place. The silica alumina thus prepared, may be utilized in the preparation of molybdena-on-silica-alumina catalysts, that may be utilized in the process of my invention.

The silica-alumina thus formed may be wet thoroughly, or "soaked," with aqueous ammonium molybdate, preferably a concentrated solution. The silica-alumina thus soaked, may then be dried and ignited to produce the molybdena-on-silica-alumina catalyst applicable for use in my process. The molybdena ($MoO_3$) content of the molybdena-on-silica-alumina catalyst is usually within the range of from 0.1 to 20 per cent by weight, preferably within the limits of 5 to 15 per cent.

Similarly, the molybdena-on-alumina catalyst for my process may be prepared by soaking alumina with aqueous ammonium molybdate, preferably a concentrated solution, and drying and igniting the alumina thus soaked. The resulting molybdena-on-alumina catalyst may be in the form of pellets, often the conventional ⅛" to ¼" size or it may be granular. However, other forms may be used if desired. The molybdena-on-alumina catalyst thus prepared, contains from 0.1 to 20 per cent by weight of molybdena ($MoO_3$), preferably in an amount from 5-15 per cent.

In either of the catalysts of my process, the dioxide is generally considered to be the active molybdena, and to be formed rapidly upon contact of the tri-oxide with hydrogen at the elevated temperature and pressure conditions of my process.

In the following description, one method of operating my process will be specifically disclosed. The figure is a diagrammatic illustration of one form of apparatus in which my process may be practiced. It is to be understood that this flow diagram is diagrammatic only and may be altered in many respects by those skilled in the art and yet remain within the intended scope of my invention.

Referring then to a preferred embodiment of my invention, as illustrated in the figure, petroleum residue charge stock in line 10, such as a reduced crude oil having an initial boiling point in the range of 700-850° F., is admixed with recycle residual stock from line 9, and with fresh and recycle hydrogen supplied through lines 8 and 20. Each recycle stream is described more fully, later in this specification. The admixture is passed to preheater 11, heated to a temperature in a range of 825° to 910° F., and passed through line 14 to reactor 12, which contains a bed of molybdena-on-silica-alumina catalyst 15, superposed on a bed of molybdena-on-alumina catalyst 17, line 18 indicating the line of demarcation between the two beds. Preheated charge stock from line 14 enters reactor 12 at a point in the upper portion of bed 17 preferably slightly below demarcation line 18. Catalyst temperatures in reactor 12 are within the range of 840 to 925° F., the temperature of catalyst bed 15 being maintained preferably within the range of 840 to 910° F. and the temperature of catalyst bed 17 being within the range of 875-925° F. Also entering reactor 12 is the remaining portion of the fresh and recycled hydrogen supplied through lines 8 and 16, and passed through line 21, preheated in preheater 22 to a temperature preferably in the range of 900 to 1000° F., and passed through line 23 to reactor 12, entering at a point in the lower part, preferably at the bottom. The total hydrogen circulation, i. e. the total fresh and recycle hydrogen entering reactor 12 from lines 8 and 16 is maintained at a rate within the limits of 5000-15000 standard cubic feet per barrel of fresh oil charge. Charge stock entering reactor 12 through line 14, and initially contacting bed 17, is partially vaporized, the unvaporized portion flowing downwardly through bed 17. The vaporized material, along with hydrogen added through line 14 is carried upwardly through catalyst bed 15 in a stripping action by and with hydrogen having entered the reactor through line 23 and carrying with it any hydrocarbon vapors formed in bed 17 during the downward flow of liquid charge. The hydrocarbon vapors passing through catalyst bed 15, are converted in a major proportion to relatively high-grade gasoline and in a minor proportion to Diesel oil. Downward flowing liquid charge in bed 17 is converted to high-grade Diesel fuel. The reaction in catalyst bed 15 is in vapor phase and the reaction in catalyst bed 17 is usually in liquid or in mixed phase. In catalyst bed 17, the hydrocarbon and hydrogen are contacted in countercurrent flow, and in catalyst bed 15 the flow is concurrent.

Liquid phase effluent from reactor 12 is passed from the bottom through line 29 to high pressure accumulator 30 along with some vapors formed in catalyst bed 17 and not carried upwardly by the stripping action of hydrogen. Vapor phase effluent from reactor 12 is passed from the top through line 24 and condenser 26 to high pressure accumulator 28. The overhead from accumulator 30, comprising hydrogen and some light hydrocarbons is passed through lines 31 and 34 to high pressure scrubber 33. Overhead from separator 28, rich in hydrogen and containing some light hydrocarbons, is passed through lines 35 and 34 to high pressure scrubber 33. Scrubber 33 is an oil absorber of conventional design and utilizes a lean absorber oil from stripper 47, described later in this specification. An overhead hydrogen stream of 80 to 90 per cent purity is passed from scrubber 33 through line 16 for recycle to reactor 12, or for discard, in part or in whole through line 38.

The bottom product of accumulator 30 is passed through line 32 to low-pressure separator 39. The bottom product of accumulator 28 is passed through line 40 to low-pressure separator 41. Overhead product from separator 39, rich in light hydrocarbons and containing minor amounts of hydrogen is passed through lines 42 and 45 to a gas absorber-stripper system comprising gas absorber 46 and stripper 47, of the conventional type employing a mineral seal absorber oil. Overhead product from separator 41, also rich in light hydrocarbons and containing minor amounts of hydrogen is passed to the gas-absorber-stripper system through lines 44 and 45. Fresh absorber oil is added to the system through line 73. Vapors in the absorber system, introduced through line 45 are passed in countercurrent flow to downwardly flowing lean absorber oil from stripper 47. Absorber oil is circulated between vessels 46 and 47 through lines 48 and 49. Lean oil from stripper 47 is also passed through line 74 to scrubber 33. Enriched absorber oil from scrubber 33 is passed through lines 51 and 49, entering stripper zone 47, along with rich absorber oil leaving absorber 46 through line 50. Hydrocarbon overhead from stripper 47 is passed through lines 52 and 53 to fractionation means 54. Bottom product from separator 41 is passed through line 60, and together with stripper 47 overhead from line 52 is passed through line 53 to fractionation means 54, comprising a plurality of fractionation steps. Products from fractionation means 54 are a butane-and-lighter fraction withdrawn through valved outlet 55, a gasoline fraction withdrawn through outlet 56, a Diesel fuel fraction withdrawn through outlet 57, and a heavy residue withdrawn through outlet 9. Heavy residue in line 9, having an initial boiling point above about 700° F., is a minor fraction of the total product from fractionation means 54. Diesel oil may be withdrawn from outlet 57 through line 59 and combined with residual product from line 9 to form a fuel oil fraction, which may be withdrawn from outlet 58. Residual product in line 9 may be recycled to reactor 12 or withdrawn through outlet 68.

Bottom product from separator 39 is passed through outlet 36 and line 61 to fractionation means 62. If desired, bottom product from separator 39 may be directly recycled to reactor 12 through outlet 36, lines 25 and 9. Diesel oil is the chief product obtained from fractionation means 62 and is withdrawn through outlet 64. A minor amount of gasoline and lighter product, formed in catalyst bed 17, but not removed by stripping action of hydrogen, is separated in fractionation means 62 and withdrawn through outlet 63. A fuel oil fraction boiling in the range of 750-850° F. is withdrawn through outlet 65. Heavy residue, having an initial boiling point above 850° F. is withdrawn through outlet 66 and recycled through line 9 to reactor 12. If desired, product may be withdrawn from line 65 through line 70 and combined in any desired proportion with residual product from line 66, withdrawn through line 71 and the combined fraction, a fuel oil, withdrawn through outlet 72.

Diesel oil produced in catalyst bed 15 is of good quality, having a cetane number usually in the range of 55-60. Diesel oil product produced in catalyst bed 17 is of somewhat higher quality, having a cetane number usually in the range of 60-65. Diesel oil product from fractionation means 62 and 54 may be combined by means not shown, or utilized separately, as desired.

For convenience and clarity certain apparatus, such as, surge tanks, pumps, compressors, accumulators, valves, etc. have not been shown in the drawing. Obviously various modifications of the present invention may be practiced without departing from the scope of the invention.

Advantages of this invention will be illustrated by the following examples. The reactants, their proportions, and other special ingredients are presented as being typical and should not be construed to limit the invention unduly.

EXAMPLE I

Hutchinson and Gray County, Texas, crude was topped to produce a topped crude stock having an A. P. I. gravity of 25.4°, and boiling in a temperature range above 700° F. The topped crude thus produced was admixed with fresh hydrogen in a proportion of about 5,000 standard cubic feet per barrel of fresh charge stock, and the mixture was passed, in a hydrogenolysis step, through a bed of molybdena-on-silica-alumina catalyst, prepared from a commercially available silica-alumina, and containing 0.9 weight per cent molybdena. The hydrogenolysis was conducted at a temperature of 850° F., a pressure of 5000 p. s. i. g. and at a space velocity of 1.3 volumes fresh oil charge per catalyst volume per hour. The product contained a gasoline fraction amounting to 33.4 liquid volume per cent of the fresh oil charged, which fraction had clear ASTM and Research octane numbers of 60.8 and 63.8 respectively; with 3 cc. tetraethyl lead added per gallon, the respective ASTM and Research octane numbers were 80.2 and 82.8 respectively. Diesel oil product amounted to 26.4 liquid volume per cent of the fresh oil charged and had a cetane number of 51.8. Other pertinent and related data are shown in Table I.

EXAMPLE II

Hydrogenolysis of the topped crude stock of Example I was conducted in accordance with the method and hydrogenolysis conditions of Example I in the presence of a molybdena-on-silica-alumina catalyst prepared from the commercially available silica-alumina of Example I, and containing 6.0 weight per cent molybdena. The product contained a gasoline fraction amounting to 41.8 liquid volume per cent of the fresh oil charged, which fraction had a clear ASTM octane number of 55.8; with 3 cc. of tetraethyl lead added per gallon, the ASTM octane number was 77.1. Diesel oil product amounted to 29.6 liquid volume per cent and had a cetane number of 61.0. These data along with other pertinent and related data are shown in Table I.

EXAMPLE III

Hydrogenolysis of the topped crude stock of Example I was conducted in the presence of molybdena-on-silica-alumina catalyst, prepared from the commercially available silica alumina of Example I, and containing 11.75 weight per cent molybdena. The hydrogenolysis was conducted in accordance with the method of Example I under identical hydrogenolysis conditions. The product contained a gasoline fraction amounting to 34.6 liquid volume per cent of the fresh oil charged, which fraction had clear ASTM and Research octane numbers of 53.4 and 54.8 respectively; with 3 cc. tetraethyl lead added per gallon the respective ASTM and Research octane numbers were 73.7 and 78.4. Diesel oil product amounted to 29.5 liquid volume per cent of the fresh oil charged and had a cetane number of 54.3. These data along with other pertinent and related data are shown in Table 1.

EXAMPLE IV

The topped crude stock of Example I was admixed with fresh hydrogen in a proportion of about 5,000 standard cubic feet per barrel of fresh charge stock, and the mixture was passed, in a hydrogenolysis step, through a bed of molybdena-on-alumina catalyst containing 9.0 per cent by weight molybdena. The hydrogenolysis was conducted at a temperature of 900° F., a pressure of 5000 p.s.i.g., and at a space velocity of 1.5 volumes fresh oil charge stock per volume of catalyst per hour. The product contained a gasoline fraction amounting to 30.0 liquid volume per cent of the fresh oil charged, which fraction had clear ASTM and Research octane numbers of 38.4 and 34.8 respectively; with 3 cc. tetraethyl lead added per gallon the respective octane numbers were 66.9 and 66.0. Diesel oil product amounted to 33.9 liquid volume per cent of the fresh oil charge and had a cetane number of 63.0. These data along with other pertinent and related data are shown in Table I.

EXAMPLE V

Hutchinson and Gray County, Texas, crude was topped to produce a reduced topped crude stock having an A. P. I. gravity of 23.0° and having a boiling range above 850° F. The reduced top crude thus produced, was admixed with fresh hydrogen in a proportion of about 5,000 standard cubic feet per barrel fresh charge stock, and the mixture passed in a hydrogenolysis step, through a bed of molybdena-on-alumina catalyst containing 9.0 per cent by weight molybdena. The hydrogenolysis was conducted at a temperature of 900° F., a pressure of 5,000 p. s. i. g., and a space velocity of 2.0 volumes fresh oil charge per catalyst volume per hour. The product contained a gasoline fraction amounting to 21.7 liquid volume per cent of the fresh oil charged, which fraction had an ASTM clear octane number of 35.6. Diesel oil product amounted to 23.0 liquid volume per cent of the fresh oil charged and had a cetane number of 60.4. These data along with other pertinent and related data are shown in Table II.

EXAMPLE VI

The reduced topped crude stock of Example V was admixed with fresh hydrogen in a proportion of about 5,000 standard cubic feet hydrogen per barrel of fresh oil charge stock and the admixture was passed, in a hydrogenolysis step, through a bed of molybdena-on-silica-alumina catalyst. The hydrogenolysis was conducted at a temperature of 850° F., a pressure of 5,000 p. s. i. g., and a space velocity of 1.3 liquid volumes fresh charge stock per volume of catalyst per hour. The hydrogenolysis had to be terminated prematurely due to excessive carbon deposition and coke formation on the catalyst surface.

EXAMPLE VII

The reduced topped crude stock of Example VI is admixed with hydrogen and the admixture charged to a reactor containing a bed of molybdena-on-silica-alumina hydrogenolysis catalyst having a molybdena content of 6.0 per cent by weight superposed on a bed of molybdena-on-alumina catalyst containing 9.0 weight per cent molybdena. The charge is passed at a space velocity of 2.0 volumes per volume molybdena-on-alumina catalyst per hour into the reactor, at a point in the upper portion of the lower catalyst bed, which is maintained at a temperature of 900° F., and a pressure of 5,000 p. s. i. g. The total hydrogen circulation rate (recycle and fresh hydrogen) is 10,000 standard cubic feet per barrel of fresh charge, part of which is admixed with fresh oil charge as already described, and the remainder of which is introduced into the lower catalyst bed through the bottom of the reactor. Charge stock entering the upper portion of the lower catalyst bed is partially vaporized, the unvaporized portion passing downwardly through the lower catalyst bed in countercurrent flow to the hydrogen introduced through the bottom of the reactor. Some hydrocarbon vapors are formed during the countercurrent flow. The vaporized portion of the charge, the hydrogen introduced in admixture with the charge stock and hydrocarbon vapors formed during the countercurrent flow are removed from the lower catalyst bed by a stripping action of the upwardly flowing hydrogen and the resulting hydrogen-hydrocarbon mixture is passed through the upper bed of molybdena-on-silica-alumina catalyst which is maintained at about the same temperature and pressure conditions as those of the lower catalyst bed. The reaction takes place in the mixed phase in the lower bed and in the vapor phase in the upper bed. The combined effluent from the two catalyst beds contains a gasoline fraction in an amount of 33 liquid volume per cent of the fresh oil charged and a Diesel oil fraction amounting to 15 liquid volume per cent of the fresh oil charged. The gasoline fraction has a clear ASTM octane number of 54 and the Diesel fraction has a cetane number of 57. These data and other pertinent data are shown in Table II.

TABLE I

*Hydrogenolysis of topped crude (material boiling 700° F.)*

| Example No. | Wt. Per Cent, MoO₃ | Total Product, °API | Total Product | | | | | | | | | | | | |
|---|---|---|---|---|---|---|---|---|---|---|---|---|---|---|---|
| | | | Gasoline, 85-400° F. | | | | | Diesel Oil, 400-700° F. | | | Gas Oil, 700-850° F. | | Residue, >850° F. | |
| | | | Liquid, Vol. Per Cent | °API | ASTM Octane No. | | Research Octane No. | | Liquid, Vol. Per Cent | °API | Cetane No. | Liquid, Vol. Per Cent | °API | Liquid, Vol. Per Cent | °API |
| | | | | | Clear | TEL +3 cc. | Clear | TEL +3 cc. | | | | | | | |

*A. Catalyst, MoO₃-on-Silica-Alumina, Temp. 850° F., Press. 5,000 p. s. i. g., Sp. Vel. 1.5, Hydrogen 5,000 c. f./b. Fresh Oil*

| 1 | 0.9 | 38.7 | 33.4 | 60.3 | 60.8 | 80.2 | 63.8 | 82.8 | 26.4 | 35.8 | 51.8 | 13.7 | 33.5 | 25.8 | 21.5 |
| 2 | 6.0 | 43.6 | 41.8 | 57.7 | 55.8 | 77.1 | | | 29.6 | 39.0 | 61.0 | | | 28.3 | 28.1 |
| 3 | 11.75 | 41.0 | 34.6 | 58.6 | 53.4 | 73.7 | 54.8 | 78.4 | 29.5 | 39.4 | 54.3 | 17.3 | 36.3 | 20.6 | 24.2 |

*B. Catalyst, MoO₃-on-Alumina, Temp. 900° F., Press. 5,000 p. s. i. g., Sp. Vel. 1.5, Hydrogen 5,000 c. f./b. Fresh Oil*

| 4 | 9.0 | 41.7 | 30.0 | 58.7 | 38.4 | 66.9 | 34.8 | 66.0 | 43.9 | 39.0 | 63.0 | 18.3 | 35.5 | 13.0 | 25.2 |

TABLE II

*Hydrogenolysis of reduced topped crude (material boiling 850° F.)*

[Temperature 900° F., Pressure 5,000 p. s. i. g., Sp. Vel. 2.0, Hydrogen, 10,000 c. f./b. Fresh Oil.]

| Example No. | Wt. Per Cent, MoO₃ | Total Product, °API | Total Product | | | | | | | | | | |
|---|---|---|---|---|---|---|---|---|---|---|---|---|---|
| | | | Gasoline, 85-400° F. | | | Diesel Oil, 400-700° F. | | | Gas Oil, 700-850° F. | | Residue, >850° F. | |
| | | | Liquid, Vol. Per Cent | ASTM Octane No. | | Liquid, Vol. Per Cent | °API | Cetane No. | Liquid, Vol. Per Cent | °API | Liquid, Vol. Per Cent | °API |
| | | | | °API | Clear | | | | | | | |

*A. Catalyst, MoO₃-on-alumina*

| 5 | 9.0 | 34.7 | 21.7 | 57.9 | 35.6 | 23.0 | 38.4 | 60.4 | 14.4 | 31.5 | 43.9 | 25.2 |

*B. Two Catalyst System—MoO₃-on-silica-alumina.¹ Superposed on MoO₃-on-alumina.² Hydrogen, 10,000 c. f./b. Fresh Oil*

| 7 | ²9.0 ¹6.0 | | 33 | | 54 | 15 | | 57 | 10 | | 44 | |

I claim:

1. An improved process for the production of high-grade gasoline and Diesel fuel from petroleum residue stocks, comprising introducing such a stock admixed with hydrogen at a temperature within the limits of from 875 to 925° F. and at a pressure of at least 1000 p. s. i. g. to a first catalyst bed comprising molybdenum oxide-on-alumina at a point in the upper portion thereof, introducing hydrogen into said bed of catalyst at a point in the lower portion thereof, vaporizing a portion of said stock upon initially contacting same with said catalyst, passing the unvaporized portion by gravity through said first catalyst in countercurrent flow to hydrogen, forming hydrocarbon vapors during said countercurrent flow and removing same together with hydrogen and hydrocarbon vapor present initially in the upper portion of said catalyst by stripping action of the countercurrently flowing hydrogen, passing the resulting hydrogen-hydrocarbon vapor mixture from said first catalyst and passing same through a second catalyst bed comprising molybdenum oxide-on-silica-alumina at a temperature within the limits of 840 and 910° F. and at a pressure of at least 1000 p. s. i. g., withdrawing liquid effluent from said first catalyst bed and vaporous effluent from said second catalyst bed, and recovering as products of the process from said vaporous effluent high-quality gasoline and Diesel oil and from said liquid effluent high-grade Diesel oil.

2. An improved process for the catalytic hydrogenolysis of refinery residual oils, comprising introducing such an oil admixed with hydrogen into a catalytic hydrogenolysis zone containing a lower bed of granular molybdenum oxide-on-alumina hydrogenolysis catalyst at a temperature within the limits of 875 and 925° F. and at a pressure of at least 1000 p. s. i. g., at a space velocity within the limits of 0.5 to 3.0 based on the volume of fresh oil per volume of said lower catalyst bed per hour, introducing the resulting oil-hydrogen admixture into said lower catalyst bed at a point in an upper portion thereof, introducing hydrogen into said lower catalyst bed at a point in the lower portion thereof and passing same upwardly therethrough, vaporizing a portion of said oil upon initially contacting same with said lower catalyst bed, passing the unvaporized portion by gravity through said lower catalyst bed in countercurrent flow to hydrogen, removing total vapors from said lower catalyst bed by stripping action of the countercurrently flowing hydrogen, passing the resulting hydrogen-hydrocarbon vapor mixture through an upper bed of molybdenum oxide-on-silica-alumina hydrogenolysis catalyst in said hydrogenolysis zone at a temperature within the limits of 840 and 910° F. and at a pressure of at least 1000 p. s. i. g., withdrawing liquid effluent from said lower catalyst bed and vapor effluent from said upper catalyst bed, and recovering from said effluents as products of the process high-quality gasoline, and high-quality Diesel fuel.

3. An improved process for the production of high grade gasoline and Diesel fuel from refinery residual oils, comprising admixing such an oil with fresh hydrogen, a recycled residual oil, and with a recycled hydrogen stream of at least 80 per cent purity, each said recycle stream being described more fully hereinafter; preheating the hydrogen-oil admixture and introducing the preheated admixture into a first hydrogenolysis catalyst bed comprising molybdenum oxide-on-alumina at a point in the upper portion thereof; maintaining said first catalyst at a temperature in the range of 875 to 925° F. and at a pressure of at least 1000 p. s. i. g., introducing fresh hydrogen and said recycled hydrogen into said first catalyst bed in the lower portion thereof and passing same upwardly therethrough; the total hydrogen introduced to the system amounting to within 5000–15000 cubic feet per barrel of fresh oil charged; vaporizing a portion of the oil charge stock upon initially contacting same with said first catalyst bed and passing the unvaporized portion thereof downwardly through said first catalyst bed in countercurrent flow with hydrogen introduced in the lower portion, and forming hydrocarbon vapors during said countercurrent flow and removing same together with hydrogen and hydrocarbon vapors present initially in the upper portion of said first catalyst bed by stripping action of the counter-currently flowing hydrogen; passing from said first catalyst bed the resulting hydrogen-hydrocarbon vapor mixture and contacting same with a bed of a second hydrogenolysis catalyst comprising molybdenum oxide-on-silica-alumina at substantially the same pressure as aforesaid and at a temperature in the range of 840–910° F.; passing total effluent from the top portion of said second catalyst bed and separating same into a hydrogen-rich fraction of at least 80 per cent purity and a residual hydrocarbon fraction, passing total effluent from the lower portion of said first catalyst bed and separating same into a hydrogen-containing fraction and a residual hydrocarbon fraction, separating said hydrogen-containing fraction into a light residue and a hydrogen fraction of at least 80 per cent purity, passing said light residue together with aforesaid residual hydrocarbon fraction from said second catalyst bed to a first fractionation means and passing the residual hydrocarbon fraction from said first catalyst bed to a second fractionation means, recovering from each aforesaid residual hydrocarbon fractionation means a residual recycle stock and recycling each such recycle stock to be admixed with fresh oil stock; recycling said hydrogen fraction from said second catalyst bed effluent together with said hydrogen fraction from said first catalyst bed effluent as aforesaid, and recovering as products of the process from first said fractionation means, normally gaseous hydrocarbons, high quality gasoline, and Diesel oil, and from second aforesaid fractionation means, high quality Diesel oil and fuel oil.

4. An improved process for the production of high grade gasoline and Diesel fuel from refinery residual oils, comprising introducing such an oil admixed with hydrogen of at least 80 per cent purity into the upper portion of a first catalyst bed comprising molybdenum oxide-on-alumina maintained at a temperature in the range of 875 to 925° F. and at a pressure of at least 1000 p. s. i. g., introducing hydrogen into said first catalyst bed at a point in the lower portion thereof and passing same upwardly therethrough, vaporizing a portion of the oil charge upon initially contacting same with said first catalyst and passing the unvaporized portion downwardly through said first catalyst bed in countercurrent flow with hydrogen, forming hydrocarbon vapors during said countercurrent flow and removing same together with hydrogen and hydrocarbon vapors present initially in the upper portion of said first catalyst bed by stripping action of the countercurrently flowing hydrogen; passing from said first catalyst bed the resulting hydrogen-hydrocarbon vapor mixture and contacting same with a second bed of catalyst comprising molybdenum oxide on-silica-alumina maintained at substantially the same pressure as aforesaid and at a temperature in the range of 840 to 910° F.; withdrawing vapor effluent from the top of said second catalyst bed and liquid effluent from the bottom of said first catalyst bed and recovering as products of the process from said vapor effluent, high-quality gasoline and Diesel fuel and from said liquid effluent high-quality Diesel fuel.

5. An improved process for the catalytic hydrogenolysis of refinery residual oils comprising preheating such an oil admixed with fresh hydrogen and recycled hydrogen of at least 80 per cent purity and recycled oil, each said recycled stream described more fully hereinafter; introducing the preheated admixture into a bed of molybdenum oxide-on-alumina catalyst at a point in the upper portion thereof at a temperature within the limits of 875 and 925° F. and at a pressure of at least 1000 p. s. i. g., introducing fresh hydrogen and recycled hydrogen of purity aforesaid into said catalyst bed at a point in the lower portion thereof, vaporizing a portion of the oil charge stock upon initially contacting same with said catalyst bed and passing the unvaporized portion thereof downwardly through said catalyst bed in countercurrent flow with hydrogen, forming hydrocarbon vapor during said countercurrent flow and removing same together with hydrogen and hydrocarbon vapors initially present in the upper portion of said catalyst bed by stripping action of the countercurrently flowing hydrogen; passing from said catalyst bed the resulting hydrogen-hydrocarbon vapor mixture and passing same through a bed of molybdenum oxide-on-silica-alumina catalyst at a temperature within the limits of 840 and 910° F. and at a pressure within the limits of 1000 and 20,000 p. s. i. g.; passing effluent from the top portion of said molybdenum oxide-on-silica-alumina catalyst bed and separating same into a hydrogen-rich fraction of at least 80 per cent purity and a residual hydrocarbon fraction; passing effluent from a lower portion of said molybdenum oxide-on-alumina catalyst bed and separating same into a hydrogen fraction of said purity and a residual hydrocarbon fraction; recovering from each of said residual hydrocarbon fractions a heavy residual oil and recycling each such heavy residual oil to be admixed with fresh oil stock as aforesaid, recycling each of the aforesaid hydrogen streams, and recovering as products of the process from the aforesaid residual hydrocarbon fractions, high-quality gasoline, and high-quality Diesel oil.

6. An improved process for the catalytic hydrogenolysis of refinery residual oils in a catalyst zone containine a lower bed of a first catalyst comprising molybdenum oxide-on-alumina and an upper bed of a second catalyst comprising molybdenum oxide-on-silica-alumina, said process comprising introducing such a stock admixed with hydrogen at a temperature within the limits of 875 to 925° F. and a pressure within the limits of from 1000 to 20,000 p. s. i. g. into said first catalyst bed at a point in the upper portion thereof, introducing hydrogen into said first catalyst bed at a point in the lower portion thereof vaporizing a portion of said stock upon initially contacting same with said first catalyst bed and passing the unvaporized portion thereof by gravity through said first catalyst bed in countercurrent flow to hydrogen, forming hydrocarbon vapors during said countercurrent flow and removing same together with hydrogen and hydrocarbon vapor present initially in the upper portion of said first catalyst bed by stripping action of the countercurrently flowing hydrogen; passing the resulting hydrogen-hydrocarbon vapor mixture from said first catalyst bed upwardly and through said second catalyst bed at a temperature within the limits of 840 to 910° F. and a pressure within the limits of 1000 to 20,000 p.s. i.g., withdrawing liquid effluent from said first catalyst bed and withdrawing vapor effluent from said second catalyst bed and recovering respectively from said vapor effluent and said liquid effluent high-quality gasoline and high-quality Diesel fuel as products of the process.

7. An improved process for the production of high-grade gasoline and Diesel fuel from refinery residual oils, comprising admixing said oil with fresh hydrogen, a recycled residual oil and a recycled hydrogen stream of at least 80 per cent purity, each said recycle stream being described more fully hereinafter; preheating the hydrogen-oil admixture and passing the preheated admixture to a catalytic hydrogenolysis zone containing a lower bed of granular catalyst comprising from 0.1 to 20 per cent by weight of molybdenum oxide deposited on granular alumina and an upper bed of granular catalyst comprising from 0.1 to 20 per cent by weight of molybdenum oxide deposited on granular silica-alumina prepared by treating a hydrous silica gel with an aqueous solution of an aluminum salt to absorb 0.1 to 2 per cent by weight of alumina on said silica and subsequently washing and drying the resulting silica-alumina gel, and thereafter depositing molybdenum oxide on the resulting dried silica-alumina gel; introducing said preheated admixture into the upper part of said lower bed, maintaining said lower bed at a temperature in the range of 875-925° F. and at a pressure of at least 1000 p. s. i. g., introducing fresh hydrogen and said recycled hydrogen into said lower bed at a point in the lower portion thereof and passing same upwardly therethrough; the total hydrogen introduced to the system amounting to within 5000-15000 cubic feet per barrel of fresh oil charged; vaporizing a portion of the oil charge upon initially contacting same with said lower bed and passing the unvaporized portion downwardly through said lower bed in countercurrent flow with hydrogen, forming hydrocarbon vapors during said countercurrent flow and removing same together with hydrogen and hydrocarbon vapors present initially in the upper portion of said lower bed by stripping action of the countercurrently flowing hydrogen; passing from said lower bed the resulting hydrogen-hydrocarbon vapor mixture and passing same through said upper bed at substantially the same pressure aforesaid and at a temperature in the range of 840-910° F., withdrawing vapor effluent from the top portion of said hydrogenolysis zone and separating same into a hydrogen-rich fraction of at least 80 per cent purity and a residual hydrocarbon fraction, withdrawing liquid effluent from the lower portion of said hydrogenolysis zone and separating same into a hydrogen-containing fraction and a residual hydrocarbon fraction, separating said hydrogen-containing fraction into a light residue and a hydrogen fraction of at least 80 per cent purity, passing said light residue together with said residual hydrocarbon fraction from said vapor effluent to a first fractionation means and passing the residual hydrocarbon fraction from said liquid effluent to a second fractionation means, recovering from each aforesaid fractionation means a residual recycle stock and recycling each to be admixed with fresh oil stock; recycling said hydrogen fraction from the vapor effluent together with said hydrogen fraction from the liquid effluent, and recovering as products of the process from the first said fractionation means, normally gaseous hydrocarbons, high-quality gasoline, and Diesel oil, and from said second fractionation means, high-quality Diesel oil and fuel oil.

8. An improved process for the catalytic hydrogenolysis of residual oils, comprising admixing such an oil with hydrogen and passing the resulting admixture to a catalytic hydrogenolysis zone containing a lower bed of granular catalyst comprising from 0.1 to 20 per cent by weight of molybdenum oxide deposited on granular alumina and an upper bed of granular catalyst comprising from 0.1 to 20 per cent by weight of molybdenum oxide deposited on granular silica-alumina prepared by treating a hydrous silica gel with an aqueous solution of an aluminum salt to absorb 0.1 to 2 per cent by weight of alumina on said silica and subsequently washing and drying the resulting silica-alumina gel, and thereafter depositing molybdenum oxide on the resulting dried silica-alumina gel; introducing said admixture into an upper part of said lower bed, maintaining said lower bed at a temperature in the range of 875–925° F. and at a pressure of at least 1000 p. s. i. g.; introducing hydrogen into said lower bed at a point in the lower portion thereof and passing same upwardly therethrough; vaporizing a portion of the oil charge upon initially contacting same with said lower bed and passing the unvaporized portion downwardly through said lower bed in countercurrent flow with hydrogen; forming hydrocarbon vapors during said countercurrent flow and removing same together with hydrogen and hydrocarbon vapors present initially in the upper portion of said lower bed by stripping action of the counter-currently flowing hydrogen; passing the resulting hydrogen-hydrocarbon vapor mixture from said lower bed and through said upper bed at substantially the same pressure aforesaid and at a temperature in the range of 840–910° F., withdrawing liquid effluent from said lower bed and vapor effluent from said upper bed, and recovering as products of the process from said vapor effluent high-quality gasoline and Diesel oil and from liquid effluent high-grade Diesel oil.

9. An improved process for the production of high-grade gasoline and Diesel fuel from refinery residual oils, comprising admixing such an oil with hydrogen, preheating the resulting hydrogen-oil admixture and introducing the preheated admixture into a catalytic hydrogenolysis zone containing a lower fixed bed of solid granular catalyst comprising molybdenum oxide deposited on granular alumina and an upper fixed bed of solid granular catalyst comprising molybdenum oxide deposited on granular silica-alumina, introducing said preheated hydrogen-oil admixture into said catalytic zone at a point in the upper portion of said lower bed, maintaining said lower bed at a temperature in the range of 875° to 925° F. and at a pressure of at least 1000 p. s. i. g., introducing hydrogen into said catalytic zone at a point in a lower portion of said lower bed and passing hydrogen thus introduced upwardly therethrough, vaporizing a portion of the oil charge upon initially contacting same with said lower bed and passing an unvaporized portion downwardly through said lower bed in countercurrent flow with hydrogen, forming hydrocarbon vapors during said countercurrent flow and passing same together with hydrogen and hydrocarbon vapors present in the upper portion of said lower bed subsequent to introducing said oil-hydrogen admixture thereinto by stripping action of the countercurrently flowing hydrogen, passing from said lower bed the resulting hydrogen-hydrocarbon vapor mixture and passing same through said upper bed at substantially the same pressure aforesaid and at a temperature in the range of 840° to 910° F., withdrawing vapor effluent from a top portion of said catalytic zone, withdrawing liquid effluent from a lower portion of said catalytic zone, and recovering as products of the process from said vapor effluent high-quality gasoline and Diesel oil and recovering from said liquid effluent a high-grade Diesel oil.

10. An improved process for the production of high-grade gasoline and Diesel fuel from refinery residual oils, comprising admixing such an oil with fresh hydrogen, a recycled residual oil, and a recycled hydrogen stream of at least 80% purity, each said recycle stream being described more fully hereinafter, preheating the hydrogen-oil admixture and passing the resulting preheated mixture to a catalytic hydrogenolysis zone containing a lower fixed bed of granular catalyst comprising from 0.1 to 20% by weight of molybdenum oxide deposited on granular alumina and an upper fixed bed of granular catalyst comprising from 0.1 to 20% by weight of molybdenum oxide deposited on granular silica-alumina, introducing said preheated admixture into an upper portion of said lower bed, maintaining said lower bed at a temperature in the range of 875 to 925° F. and at a pressure of at least 1000 p. s. i. g., introducing fresh hydrogen and said recycled hydrogen to said lower bed at a point in the lower portion thereof and passing same upwardly therethrough, the total hydrogen introduced to the system amounting to within 5000–15,000 cubic feet per barrel of fresh oil charged; vaporizing a portion of the oil charge upon initially contacting same with said lower bed and passing the unvaporized portion downwardly through said lower bed in countercurrent flow with hydrogen, forming hydrocarbon vapors during said countercurrent flow and removing same together with hydrogen and hydrocarbon vapors present initially in the upper portion of said first bed by stripping action of the countercurrently flowing hydrogen; passing from said lower bed the resulting hydrogen-hydrocarbon vapor mixture and passing same through said upper bed at substantially the same pressure aforesaid and at a temperature in the range of 840–910° F., withdrawing vapor effluent from the top portion of said hydrogenolysis zone and separating same into a hydrogen-rich fraction of at least 80 per cent purity and a residual hydrocarbon fraction, withdrawing liquid effluent from the lower portion of said hydrogenolysis zone and separating same into a hydrogen-containing fraction and a residual hydrocarbon fraction, separating said hydrogen-containing fraction into a light residue and a hydrogen fraction of at least 80 per cent purity, passing said light residue together with said residual hydrocarbon fraction from said vapor effluent to a first fractionation means and passing the residual hydrocarbon fraction from said liquid effluent to a second fractionation means, recovering from each aforesaid fractionation means a residual recycle stock and recycling each to be admixed with fresh oil stock, recycling said hydrogen fraction from the vapor effluent together with said hydrogen fraction from the liquid effluent, and recovering as products of the process from first said fractionation means, normally gaseous hydrocarbons, high-quality gasoline, and Diesel oil, and from said second fractionation means, high quality Diesel oil and fuel oil.

11. An improved process for the catalytic hydrogenolysis of refinery residual oils, comprising introducing such an oil admixed with hydrogen into a catalytic hydrogenolysis zone containing a lower bed of granular catalyst comprising from 0.1 to 20 weight per cent of molybdenum oxide deposited on alumina and an upper bed of granular catalyst comprising from 0.1 to 20 per cent by weight of molybdenum oxide deposited on silica-alumina, introducing the resulting oil-hydrogen admixture into said lower catalyst bed at a point in the upper portion thereof and at a temperature within the limits of 875 and 925° F., introducing hydrogen into said lower catalyst bed at a point in the lower portion thereof and passing same upwardly therethrough, vaporizing a portion of said oil upon initially contacting same with said lower catalyst bed, the total hydrogen introduced to the system amounting to within 5000 to 15,000 standard cubic feet per barrel of fresh oil charged, passing the unvaporized oil portion by gravity through said lower bed in countercurrent flow to hydrogen, forming hydrocarbon vapors during said countercurrent flow and removing same together with hydrogen and hydrocarbon vapors present initially in the upper portion of said lower bed by stripping action of the countercurrently flowing hydrogen, passing the resulting hydrogen-hydrocarbon vapor mixture from said lower bed and then through said upper bed at substantially the same pressure as aforesaid and at a temperature in the range of 840 to 910° F., withdrawing liquid effluent from said lower catalyst bed and vapor effluent from said upper catalyst bed, and recovering from said effluents as products of the process high quality gasoline and high quality Diesel fuel.

REAGAN T. WILSON.

REFERENCES CITED

The following references are of record in the file of this patent:

UNITED STATES PATENTS

| Number | Name | Date |
| --- | --- | --- |
| 1,890,438 | Pier | Dec. 6, 1932 |
| 1,934,055 | Gohr | Nov. 7, 1933 |
| 1,955,297 | Jennings | Apr. 17, 1934 |
| 1,958,528 | Wilson | May 15, 1934 |
| 1,960,206 | Edmonds | May 22, 1934 |
| 2,321,841 | Mekler et al. | June 15, 1943 |
| 2,341,792 | Kanhofer | Feb. 15, 1944 |
| 2,377,728 | Thomas | June 5, 1945 |

OTHER REFERENCES

Production of High Cetane Number Diesel Fuels by Hydrogenation, by Tilton et al., Indust. and Eng. Chem., July 1948, vol. 40, No. 7, pages 1269 to 1273.

Certificate of Correction

Patent No. 2,541,317 February 13, 1951

REAGAN T. WILSON

It is hereby certified that error appears in the printed specification of the above numbered patent requiring correction as follows:

Column 2, line 34, after the word "such" insert *that*; column 13, line 44, for "containine" read *containing*; column 15, line 36, after "from" insert *said*;

and that the said Letters Patent should be read as corrected above, so that the same may conform to the record of the case in the Patent Office.

Signed and sealed this 10th day of July, A. D. 1951.

[SEAL]

ERNEST F. KLINGE,
*Assistant Commissioner of Patents.*